United States Patent
Sander et al.

(10) Patent No.: US 12,153,886 B2
(45) Date of Patent: Nov. 26, 2024

(54) DEVICES, SYSTEMS, AND METHODS FOR DISPLAYING AND LINKING LEGAL CONTENT

(71) Applicant: FASTCASE, INC., Washington, DC (US)

(72) Inventors: Michael Sander, New York, NY (US); Itai Gurari, Ivins, UT (US); Damien Riehl, Saint Paul, MN (US)

(73) Assignee: FASTCASE, INC., Washington, DC (US)

( * ) Notice: Subject to any disclaimer, the term of this patent is extended or adjusted under 35 U.S.C. 154(b) by 253 days.

(21) Appl. No.: 17/746,447

(22) Filed: May 17, 2022

(65) Prior Publication Data
US 2023/0376689 A1 Nov. 23, 2023

(51) Int. Cl.
| | |
|---|---|
| G06F 40/289 | (2020.01) |
| G06F 16/84 | (2019.01) |
| G06F 40/221 | (2020.01) |
| G06F 40/30 | (2020.01) |

(52) U.S. Cl.
CPC ............ *G06F 40/289* (2020.01); *G06F 16/84* (2019.01); *G06F 40/221* (2020.01); *G06F 40/30* (2020.01)

(58) Field of Classification Search
CPC ............................. G06F 40/289; G06F 40/30
See application file for complete search history.

(56) References Cited

U.S. PATENT DOCUMENTS

| | | | |
|---|---|---|---|
| 7,899,781 B1 * | 3/2011 | Pittman ................. | G06Q 50/18 |
| | | | 707/610 |
| 11,269,889 B1 * | 3/2022 | Aversano ............ | G06F 16/2458 |
| 2009/0281726 A1 * | 11/2009 | Byrne .................... | G01C 21/34 |
| | | | 701/533 |
| 2009/0327336 A1 | 12/2009 | King et al. | |

(Continued)

FOREIGN PATENT DOCUMENTS

WO    WO2021002800 A1    1/2021

OTHER PUBLICATIONS

Sokhansanj, B. A., & Rosen, G. L. (2022). Predicting Institution Outcomes for Inter Partes Review (IPR) Proceedings at the United States Patent Trial & Appeal Board by Deep Learning of Patent Owner Preliminary Response Briefs. Applied Sciences, 12(7), 3656.*

*Primary Examiner* — Bryan S Blankenagel
(74) *Attorney, Agent, or Firm* — FRESH IP PLC; Clifford D. Hyra; John R. Bednarz

(57) ABSTRACT

A method includes receiving, by at least one processor, a request for a docket report associated with a particular case from a client computing device, parsing, by the at least one processor, the docket report and inserting at least one pleading tag in the docket report, each pleading tag inserted at a particular location in the docket report, transmitting, by the at least one processor, the docket report with the at least one pleading tag to the client computing device for display on a display of the client computing device, receiving, by the at least one processor, a selection of the at least one pleading tag and retrieving additional contextual content associated with the pleading tag, and transmitting, by the at least one processor, the additional contextual content associated with the pleading tag to the client computing device for display on the display of the client computing device.

27 Claims, 18 Drawing Sheets

(56) References Cited

U.S. PATENT DOCUMENTS

| | | |
|---|---|---|
| 2014/0114962 A1 | 4/2014 | Rosenburg et al. |
| 2014/0324808 A1 | 10/2014 | Sandhu et al. |
| 2016/0314146 A1 | 10/2016 | Carothers et al. |
| 2017/0039529 A1* | 2/2017 | Reicher .............. G06Q 10/1095 |
| 2017/0076001 A1 | 3/2017 | Salas et al. |
| 2019/0361960 A9 | 11/2019 | Weinreb et al. |
| 2020/0053215 A1 | 2/2020 | Kats et al. |
| 2020/0183942 A1 | 6/2020 | Smiley et al. |
| 2021/0192408 A1* | 6/2021 | Lundberg .............. G06F 40/186 |
| 2022/0164397 A1* | 5/2022 | Escalona ................ G06F 40/20 |
| 2023/0124402 A1* | 4/2023 | Song .................... G06F 40/237 |
| | | 704/9 |

\* cited by examiner

200

| | | |
|---|---|---|
| | | After that date, the transcript is publicly available. (Ciraj) (Letter ed. 11/12/2021) |
| 11/10/2021 | 54 | [Compel] —202<br>ORDER granting in part and denying in part 42 Motion to Compel. Signed by Magistrate Judge Patricia T. Morris. (KCas) (Entered: 11/10/2021) |
| 11/9/2021 | 53 | Notice of Determination of Motion Without Oral Argument re 44 MOTION TO EXTEND Case Deadlines *Plaintiff's Motion to Extend Case Deadlines* (KCas) (Entered: 11/09/2021) |
| 11/9/2021 | | Minute Entry for in-person proceedings before Magistrate Judge Patricia T. Morris: Motion Hearing held on 11/9/2021 re 42 MOTION to Compel *Document Production* filed by Ray Miller, Prescott Machine, LLC Disposition: Motion granted in part and denied in part (Court Reporter: Digitally Recorded) (KCas) (Entered: 11/09/2021) |
| 11/3/2021 | 52 | NOTICE of Appearance by Dennis Abdelnour on behalf of B&P Littleford, LLC. (Abdelnour, Dennis) (Entered: 11/03/2021) |
| 11/2/2021 | 51 | STATEMENT of Resolved and Unresolved Issues re 42 MOTION to Compel *Document Production* by All Defendants (Keener, Jason) (Entered: 11/02/2021) |
| 11/27/2021 | 50 | [Reply]<br>REPLY to Response re 44 MOTION TO EXTEND Case Deadlines *Plaintiff's Motion to Extend Case Deadlines Plaintiff's Reply in Support of Its Motion to Extend Case Deadlines* filed by B&P Littleford, LLC. (Attachments:# 1 Index of Exhibits, # 2 Exhibit A. October 21,2021 Letter to Clark Hill, # 3 Exhibit B. October 13,2021 Email from Clark Hill) (Huget,J.) (Entered: 10/27/2021) |
| 10/25/2021 | 49 | [Compel Production]<br>REPLY to Response re 42 MOTION to Compel Document Production filed by All Defendants. (Keener,Jason) (Entered: 10/25/2021) |
| 10/20/2021 | 48 | [Response]<br>RESPONSE to 44 MOTION TO EXTEND Case Deadlines *Plaintiff's Motion to Extend Case Deadlines* filed by All Defendants. (Attachments: # 1 Keener Declaration) (Keener, Jason) (Entered: 10/20/2021) |
| 10/18/2021 | 47 | [Compel Production]<br>RESPONSE to 42 MOTION to Compel *Document Production Plaintiff's Opposition To Defendants' Motion to Compel* filed by B&P Littleford, LLC. (Attachments: # 1 Index of Exhibits, # 2 Exhibit A, 2021-06-03 Letter to Stuart Schwartz, # 3 Exhibit B. 2021-06-23 Letter To J.Michael Huget, # 4 Exhibit C.2021-06-29 Email to Jason Keener, # 5 Exhibit D.2021-07-30 Letter to Stuart Schwartz, # 6 Exhibit E. Declaration of Sarah E. Waidelich, # 7 Exhibit F. September 2021 Emails regarding supplemental discovery) (Huget, J.) (Entered: 10/18/2021) |

| judge:(Thomas L. Ludington) 🔍  🏛 All Courts | testing 👤 Hi, admin |

▼ FILTERS   🔔 ⤴ ⤓                                                              ▼ 1 ▼

| | Motion to Compel x |
|---|---|
| ☑ Display dockets | 2 results sorted by [Newest (by filing date) ▼] |
| ☑ Display documents | No. 41 ORDER granting in part and denying in part 33 Motion to Compel |
| ○ Decisions and Orders | Document B&P Littleford, LLC v. Prescott Machine, LLC et al, 1:20.cv.13025, No. 41 (E.D.Mich. Sep.8, 2021) |
| ○ Exhibits | |
| ○ Briefs and Motions | [🔧 Motion to Compel] |
| ○ Pleadings | 🔖 Cite Document  ▽ Analyze |
| × Reset Selection | B&P Littleford. LLC v. Prescott Machine. LLC et al — 408 Docket 1:20-cv-13025, Michigan Eastern District Court (Nov.12, 2020) |
| | District Judge Thomas L. Ludington, presiding, Magistrate Judge Patricia T. Morris Copyright |
| Date Filed ⤢ | 11/10/2021 [🔧Compel] — 404 |
| [bar chart] Jan. Apr. Jul. 2021 2021 2021 | ORDER granting in part and denying in part 42 Motion to Compel. Signed by Magistrate Judge Patricia T. Morris. (KCas) (Entered: 11/10/2021) |
| Nov.1.2020 to Oct.1.2021 | 09/08/2021 [🔧Compel] — 406 |
| | ORDER granting in part and denying in part 33 Motion to Compel. Signed by Magistrate Judge Patricia T. Morris. (KCas) (Entered: 09/08/2021) |
| Search Within [    ] [Search] | 08/11/2021 📎Compel |
| | REPLY to Response re 33 MOTION to Compel *PLAINTIFF'S MOTION TO COMPEL DISCOVERY Plaintiff's Reply in Support of Its Motion to Compel Discovery* filed by B&P Littleford, LLC (Attachments: # 1 Exhibit A.) (Huget,J.) (Entered: 08/11/2021) |
| Sort by [Category ▼] ⊞ Load More | 08/04/2021 📎Compel |
| Motions New  > | RESPONSE to 33 MOTION to Compel *PLAINTIFF'S MOTION TO COMPEL DISCOVERY* filed by All Defendants. (Bolton, Jordan) (Entered: 08/04/2021) |
| | 07/21/2021 📎Compel |
| ⤴ Export | MOTION to Compel *PLAINTIFF'S MOTION TO COMPEL DISCOVERY* BY B&P Littleford, LLC. (Attachments: # 1 Index of Exhibits, # 2 Exhibit A. Plaintiffs First Requests for Production of Documents, # 3 Exhibit B. Plaintiffs First Interrogatories to Defendants, # 4 Exhibit C. Plaintiffs First Requests for Admissions to Defendants, # 5 Exhibit D. Defendants Responses to Plaintiffs First Requests for production of Documents, #6 Exhibit E. Defendants Responses to Plaintiffs First Interrogatories, # 7 Exhibit F. Defendants Responses to plaintiffs |
| Attorney  > | |
| Court  ∨ | |
| Michigan Eastern District Court  2 | |
| Firm  ∨ | |
| Benesch, Friedlander, Coplan & Aronoff  2 | |
| Clark Hill  2 | |
| Honigman  2 | 🔖 Cite Docket   ▽ Analyze |
| Judge  ∨ | admin search stats |
| | Can't find a case you think should be here? Use our supplemental search tool to find dockets |

FIG. 4

| | | |
|---|---|---|
| Sort by Category | ⊞ Load More | |
| Filter by motion/pleading name... | | |
| Motions and Pleadings | ⌄ | |
| Procedural | 1.76M › | |
| Pleading | 1.60M › | |
| Disppositive | 1.06M ⌄ | |
| Dismiss | 472k › | |
| Judgment | 379k ⌄ | |
| 🔨 Orders | 376k | |
| 💬 Motions | 2677 | |
| ↩ Responses | 167 | |
| ↩ Replys | 120 | |

| | |
|---|---|
| Dismiss: Failure to State a Claim | 58,058 › |
| Summary Judgment | 57,914 › |
| Default Judgment | 34,321 › |
| Dismiss: Lack of Jurisdiction | 23,675 › |
| Judgment on the Pleadings | 10,635 › |
| Voluntary Dismissal | 6240 › |
| Dismiss Claim | 3924 › |
| Dismiss Party | 3585 › |
| Dismiss Indictment | 1875 › |
| Dismiss: Lack of Personal Jurisdiction | 1392 › |
| Dismiss: Lack of Subject Matter Jurisdiction | 900 › |
| Dismiss Charge | 794 › |
| Judgment of Acquittal | 683 › |
| Judgment as a Matter of Law | 627 › |
| Declaratory Judgment | 436 › |
| Dismiss: Lack of Standing | 293 › |
| Dismiss: Failure to Prosecute | 125 › |
| Summary Judgment: FRCP 56(d) | 69 › |
| Timing | 748k › |
| Responding to Pleadings | 713k › |
| Judgment | 486k › |
| Counsel | 432k › |
| Order | 410k › |
| Discovery | 180k › |
| Equity | 144k › |

149,442 results sorted by [Newest (by last docket) ▼]

H.K. Pangelinan & Associates, LLC V. American Sinopan, LLC

Docket 1:21.cv.00010, Northern Mariana Islands District Court (Apr.9.2021)
Chief Judge Ramona V.Manglona, presiding
Contract - Other 12/15/2021 | ⚔ Withdraw as Counsel | ⟵ 202
Order on Motion to Withdraw as Attorney 08/11/2021 | ⚔ Scheduling Order | ⟵ 1002
Scheduling Order 05/24/2021 | 🔥 Dismiss
REPLY in Support of 3 Defendant's Motion to Dismiss filed by American Sinopan, LLC. (Sundell, Jordan) (Entered: 05/24/2021)

05/17/2021 | 🔥 Dismiss
Plaintiff's OPPOSITION to 3 Defendant's Motion to Dismiss filed by H.K. Pangelinan & Associates, LLC. (Thompson, Colin) (Entered: 05/17/2021)

05/03/2021 | 🔥 Dismiss
Defendant's MOTION to Dismiss. Jordan Sundell appearing for Defendant American Sinopan, LLC Responses due by 5/17/2021 (Attachments: # 1 Memorandum In Support of Motion to Dismiss. # 2 Certificate of Service. # 3 Proposed Order) (Sundell, Jordan) (Entered: 05/03/2021)

04/09/2021 | 🔍 Jury Trial
COMPLAINT and Demand for Jury Trial against American Sinopan, LLC. (Filing Fee: $402.00, Receipt Number: MPX1000006368.), filed by H.K. Pangelinan & Associates, LLC. (Attachments: # 1 Civil Cover Sheet) (ADE) (Entered: 04/09/2021)

☒ Cite Docket    ▽ Analyze

FIG. 10

Beau Anthony Albritton and Nikki Lorene Albritton
Docket 5:19-bk-40145, Kansas Bankruptcy Court (Feb. 19,2019)
Chief Judge Dale L. Somers, presiding

| | | |
|---|---|---|
| 04/29/2021 | ✏️ Dismiss | Order Denying Motion to Dismiss Case (Related Doc # 72) Signed on 4/29/2021. (tdc) (Entered: 04/29/2021) |
| 04/20/2021 | 🔍 Dismiss | Motion for Dismissal for Other . Filed on behalf of Trustee Jan Hamilton, With Certificate of Service. (Hamilton, Jan) (Entered: 04/20/2021) |
| 04/08/2021 | ✏️ Dismiss | Order Denying Motion to Dismiss Case (Related Doc # 56) Signed on 4/8/2021. (tdc) (Entered: 04/08/2021) |
| 01/26/2021 | 🔍 Dismiss | Motion for Dismissal for Other . Filed on behalf of Trustee Jan Hamilton, With Certificate of Service. (Hamilton, Jan) (Entered: 01/26/2021) |
| 07/31/2019 | ✏️ Dismiss | Order Denying Motion to Dismiss Case (Related Doc # 34) Signed on 7/31/2019. (tdc) (Entered: 07/31/2019) |
| 06/03/2019 | 🔍 Dismiss | Motion for Dismissal for Other . Filed on behalf of Trustee Jan Hamilton, With Certificate of Service. (Hamilton, Jan) (Entered: 06/03/2019) |

☑ Cite Docket    ▽ Analyze

Case v. Generac Power Systems Inc et al
Docket 2:21-cv-01100, Wisconsin Eastern District Court (Sept. 21, 2021)
Chief Judge Pamela Pepper, presiding
Employee Retirement (ERISA)

| 01/14/2022 | 📄 Dismiss: Lack of Jurisdiction | BRIEF in Opposition filed by Dereck Case re 55 MOTION to Dismiss for Lack of Jurisdiction MOTION TO DISMISS FOR FAILURE TO STATE A CLAIM. (Secunda, Paul) |

FIG. 10(Continued...)

DEVICES, SYSTEMS, AND METHODS FOR DISPLAYING AND LINKING LEGAL CONTENT

FIELD

The disclosure relates generally to devices, systems, and methods for displaying and linking legal content using, for instance, metadata tags. In particular, embodiments of the disclosure relate to the identification, application, and display of pleading tags, a specific type of metadata tag, to litigation documents, which assist in identifying issues and filings directly on a court docket.

BACKGROUND

Many attorneys, especially litigators, spend a large amount of time reviewing docket sheets for ongoing court cases, finding documents on these docket sheets, and searching for similar items that they find on the docket sheets.

Such docket sheets are often large, contain dense legal text, and can be time-consuming to review. Thus, creating a high-level overview of a given docket sheet, or items thereon, can be burdensome. An attorney needs to review the entire docket sheet, categorize important events and/or filings, and create a qualitative summary of the case.

Moreover, docket sheets usually do not permit any kind of effective search functionality so that attorneys can find information related to one or more entries of interest.

Displays of docket sheets are also unintuitive, leading to unnecessary time spent reading and reviewing the docket sheet.

It is with these issues in mind, among others, that various aspects of the disclosure were conceived.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

Embodiments of the present disclosure are directed towards devices, systems, and methods for identifying, displaying, and linking legal content (e.g., pleadings) using, for instance, metadata tags. A non-limiting example of such a metadata tag is a pleading tag, which assists attorneys or other staff in identifying issues and/or filings directly on a court docket sheet.

In one example, a method may include receiving, by at least one processor, a request for a docket report associated with a particular case from a client computing device, parsing, by the at least one processor, the docket report and inserting at least one pleading tag in the docket report, each pleading tag inserted at a particular location in the docket report, transmitting, by the at least one processor, the docket report with the at least one pleading tag to the client computing device for display on a display of the client computing device, receiving, by the at least one processor, a selection of the at least one pleading tag and retrieving additional contextual content associated with the pleading tag, and transmitting, by the at least one processor, the additional contextual content associated with the pleading tag to the client computing device for display on the display of the client computing device.

In another example, a system may include a memory storing computer-readable instructions and at least one processor to execute the instructions to receive a request for a docket report associated with a particular case from a client computing device, parse the docket report and insert at least one pleading tag in the docket report, each pleading tag inserted at a particular location in the docket report, transmit the docket report with the at least one pleading tag to the client computing device for display on a display of the client computing device, receive a selection of the at least one pleading tag and retrieve additional contextual content associated with the pleading tag, and transmit the additional contextual content associated with the pleading tag to the client computing device for display on the display of the client computing device.

In another example, a non-transitory computer-readable storage medium includes instructions stored thereon that, when executed by a computing device cause the computing device to perform operations, the operations including receiving a request for a docket report associated with a particular case from a client computing device, parsing the docket report and inserting at least one pleading tag in the docket report, each pleading tag inserted at a particular location in the docket report, transmitting the docket report with the at least one pleading tag to the client computing device for display on a display of the client computing device, receiving a selection of the at least one pleading tag and retrieving additional contextual content associated with the pleading tag, and transmitting the additional contextual content associated with the pleading tag to the client computing device for display on the display of the client computing device.

As noted above, there is a significant need for devices, systems, and methods that can identify and display legal content, including items in a docket sheet because conventional solutions have a number of issues and drawbacks. In particular, there is a need for solutions that identify items of interest in a docket sheet, create a high-level overview of the docket sheet, and enable searching of the docket sheet.

There are a number of challenges associated with identifying, displaying, and linking legal content such as pleadings. As an example, the amount of legal content produced in courts throughout the United States is voluminous and it is extremely time consuming for attorneys to find and review what is desired. In the United States, there are over two million documents filed each month in courts throughout the country. In many instances, it is simply not possible for an attorney to find what they are looking for in an appropriate amount of time. This can lead to inefficiencies at best and at worst can result in major problems due to the inability to meet deadlines. The conventional solutions have been associated with use of big data.

Although the documents are publicly available, it has simply not been possible to analyze the documents with conventional tools and systems because of the volume. The current documents and entries associated with court cases include hundreds of entries per case, text is unstructured, and to make matters even more difficult, the text and/or style varies by case, court, and even judge. The system discussed herein utilizes natural language processing (NLP) that can model "legal" English to understand words in context. As a result, the system discussed herein is able to classify, parse, and analyze the millions of updates to cases that occur each month in the United States.

In one example, the system discussed herein receives data, documents, and content from governmental systems and server computing devices such as Public Access to Court Electronic Records (PACER) and extracts text and data. Next, the system performs natural language processing on the unstructured text and data and inserts tags and other metadata information in the text and data to provide structured text and data associated with each case.

As discussed herein, each tag may provide visual information and aids for a user such as an attorney, paralegal, or legal support personnel including positional posture information, identifying features that are Standards Advancement for the Legal Industry (SALI) Legal Matter Specification Standard (LMSS) 2.0 Compliant, and other visual information based on colors associated with the tag.

The system includes a document analysis system and/or method for analyzing one or more entries on one or more docket sheets, and for creating one or more pleading tags based on the analysis. The document analysis system and/or method may be automated or semi-automated.

Additionally, the system generates and displays one or more pleading tags and allows a user to interact with the one or more pleading tags.

In at least one example, the pleading tags comprise one or more of the following components. The first component is an "alpha type" that identifies the type of litigation pleading, such as, for instance, a motion, a response to a previous filing, a brief, a reply brief, and the like. It should be appreciated that, depending on the method and/or system of categorization, there may be several, dozens, up to one hundred, or more than one hundred different types of litigation pleadings.

The second component is an "identifier" that identifies the substance of the litigation pleading and/or the procedural posture of the litigation pleading. Non-limiting examples, of which there may be hundreds, up to a thousand, or more than a thousand, include dismissal of the case (e.g., in a motion to dismiss), a stay (e.g., in a motion to stay), and the like. In at least a further embodiment, one or more identifiers may also be assigned an identifier category and/or an importance level.

Importance level may allow a user to filter information associated with a large case to the most important or useful elements. As an example, importance level may be used for a timeline, a pleading tag picker, and case summary generation. Importance level may be used to build and generate case summaries that may highlight important pleading tags. Case summaries that may be based on pleading tags may include the following for a particular case: a list of important pleading tags, e.g., pleading tags having an importance level over a particular value or threshold such as eight, 8/10, 4/5, or 80%, snippets of text to provide context about the pleading tag and to indicate why a tag is applied, and links to further resources associated with the pleading tag, e.g., analytics, searching, and third-party resources. A snippet may be selected from existing text and/or auto-generated.

The third component is an optional "outcome" that identifies the result of the pleading, such as, for instance, whether the pleading has been granted, partially granted, denied, partially denied, sustained, reversed, and the like. It should be appreciated that, depending on the method and/or system of categorization, there may be several, a dozen, up to twenty, or more than twenty different types of outcomes.

In at least a further example, one or more pleading tags are depicted graphically on a user interface and may each be a selectable graphical user interface (GUI) element. The GUI element may include an icon and/or background color that corresponds to the "alpha type," a descriptor corresponding to the "identifier" (e.g., a motion to dismiss may be abbreviated as "dismiss"), and a color outline that corresponds to the "outcome."

These and further and other objects and features are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein:

FIG. 2 shows a screenshot of pleading tags directly on a docket report, according to one example of the present disclosure.

FIG. 4 shows a screenshot of search results and pleading tags within those search results, according to one example of the present disclosure.

FIG. 6 shows a screenshot of a pleading tag picker, according to one example of the present disclosure.

FIG. 9 shows a screenshot that shows a docket timeline grouped by identifier, according to one example of the present disclosure.

FIG. 10 is a screenshot that shows snippet generation, according to one example of the present disclosure.

DETAILED DESCRIPTION

Figure 1A:
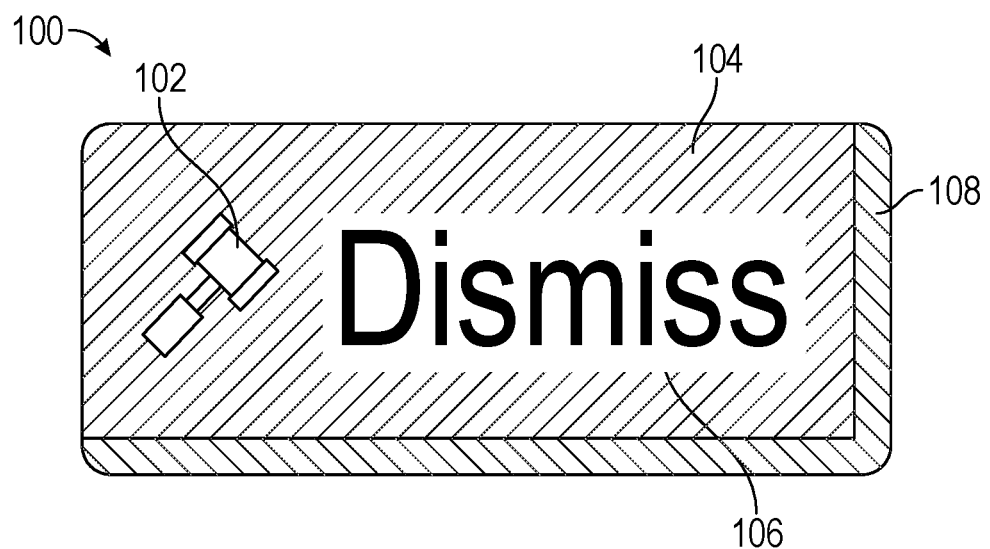
FIGS. 1A-1D show non-limiting examples of pleading tags, according to one example of the present disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc. indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc., may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

In general, the word "instructions," as used herein, refers to logic embodied in hardware or firmware, or to a collection of software units, possibly having entry and exit points, written in a programming language, such as, but not limited to, Python, R, Rust, Go, SWIFT, Objective-C, Java, JavaScript, Lua, C, C++, or C#. A software unit may be compiled and linked into an executable program, installed in a dynamic link library, or may be written in an interpreted programming language such as, but not limited to, Python, R, Ruby, JavaScript, or Perl. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage. As used herein, the term "computer" is used in accordance with the full breadth of the term as understood by persons of ordinary skill in the art and includes, without limitation, desktop computers, laptop computers, tablets, servers, mainframe computers, smartphones, handheld computing devices, and the like.

In this disclosure, references are made to users performing certain steps or carrying out certain actions with their client computing devices/platforms. In general, such users and their computing devices are conceptually interchangeable. Therefore, it is to be understood that where an action is shown or described as being performed by a user, in various implementations and/or circumstances the action may be performed entirely by the user's computing device or by the user, using their computing device to a greater or lesser extent (e.g., a user may type out a response or input an action, or may choose from preselected responses or actions generated by the computing device). Similarly, where an action is shown or described as being carried out by a computing device, the action may be performed autonomously by that computing device or with more or less user input, in various circumstances and implementations.

In this disclosure, various implementations of a computer system architecture are possible, including, for instance, thin client (computing device for display and data entry) with fat server (cloud for app software, processing, and database), fat client (app software, processing, and display) with thin server (database), edge-fog-cloud computing, and other possible architectural implementations known in the art.

Embodiments of the disclosure comprise methods, devices, and/or systems that display and link legal content using, for instance, metadata tags. A specific type of metadata tag is a pleading tag, which can be applied to litigation documents, such as pleadings, to assist attorneys, paralegals, and other staff in identifying and reviewing the type and/or substance of each pleading.

As an example, attorneys may desire to identify items so that it is possible to quickly review a case and/or a docket sheet. Business development groups within a law firm may desire to identify important parts of a case to allow the business development group to highlight the important parts of the case when pitching for new business or to respond to an event in a lawsuit. Legal billing groups and employees may desire to use tags to determine average cost to draft a summary judgment motion, average billing between complaint to discovery, discovery to trial, trial through appeals, and other periods of time. Firm management may desire a high-level understanding of what may be happening in cases handled by the firm as well as other cases handled by other firms such as competing firms. Litigation finance companies and entities may desire to perform large-scale analysis on frequency, timing, and outcome of pleadings. Third party legal software applications may desire to utilize information associated with legal filings. Companies that market to attorneys and other staff may desire to contact attorneys and staff when an important event occurs, e.g., a discovery company may make contact when a protective order may be issued.

A skilled artisan will appreciate that litigation documents, including pleadings, are presented on a "docket sheet" or "docket report," terms which will be used synonymously herein. Generally, a "docket sheet" or "docket report" is a list of all papers filed and all actions taken in a particular court case. Docket sheets are usually organized chronologically or reverse chronologically. Each entry on a docket sheet is referred to herein as a "docket entry." Docket entries may contain various pieces of information, including, for instance, the date of filing, the title of the filing, and the name of the party that submitted the filing. Filings that have already been decided by the court may additionally have information on the disposition of the filing (e.g., whether the filing was denied or granted).

In at least one embodiment of the disclosure, pleading tags comprise an "alpha type" that identifies the type of litigation pleading (e.g., a motion or a brief), an "identifier" that identifies the procedural posture and/or substance of the litigation pleading (e.g., a filing requesting dismissal or a filing requesting a stay), and, optionally, an "outcome" that identifies the result of the litigation pleading (e.g., granted or denied).

The "alpha type" may be chosen from a list of up to one hundred, one hundred to one thousand, or more than one thousand different types of litigation pleadings. The "identifier" may be chosen from a list of up to one thousand, one hundred to ten thousand, or more than ten thousand, different types of procedural postures and/or substances of the pleading. The "outcome" may be chosen from a list of up to twenty, twenty to one hundred, or more than one hundred different types of outcomes.

Display of the pleading tags may be done graphically, e.g., on a user interface. Non-limiting examples of pleading tags, and their display, are shown in FIGS. 1A-1D. In FIG. 1A, pleading tag 100 comprises an icon, graphic, or logo 102 that, in addition to a background color 104, corresponds with a specific type of litigation pleading (e.g., "motion") as part of the "alpha type." The pleading tag further comprises a descriptor 106 that corresponds to the "identifier," in a case, e.g., "Dismiss" for a filed motion to dismiss. The pleading tag further comprises a color outline 108 that corresponds to the "outcome," e.g., denial of the motion to dismiss.

Figure 1B:
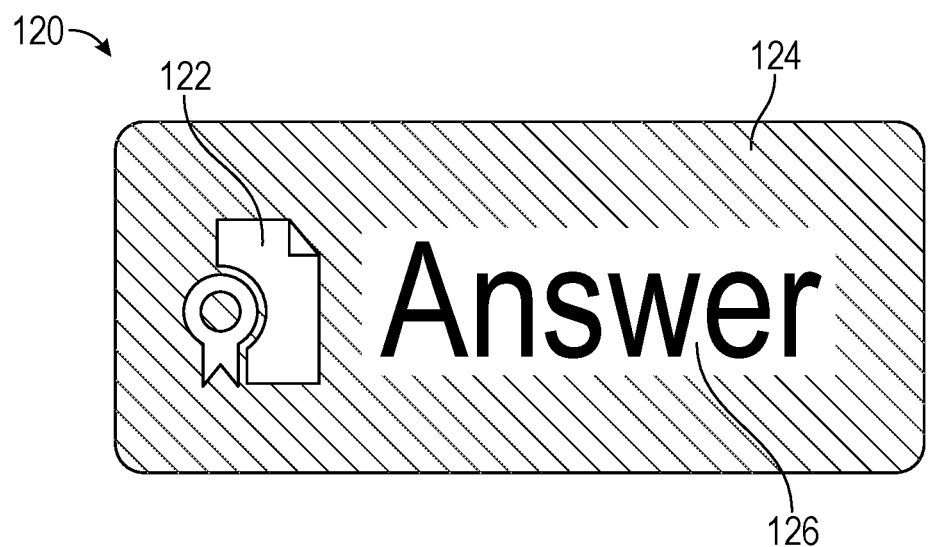

In a further non-limiting example shown in FIG. 1B, the pleading tag 120 comprises a graphical user interface (GUI) element that may include an icon 122 and a background color 124 that corresponds with a general pleading, such that the "alpha type" is "pleading." The icon 122 and the background color 124 are therefore both different from the icon 102 and the background color 104. The pleading tag 120 comprises an identifier 126 of "answer," thereby identifying the litigation pleading as a filed answer in response to a complaint. In this example, there is no colored border, indicating that there has not yet been a decided outcome on the answer.

Figure 1C:

In yet another non-limiting example shown in FIG. 1C, the pleading tag 140 comprises an icon 142 and a background color 144 that corresponds with an "alpha type" of a "reply" to a motion. The pleading tag 140 further comprises an identifier 146 of "compel production," thereby identifying the filing as a reply to a motion to compel production. As in FIG. 1B, the pleading tag in FIG. 1C does not have a colored border, indicating that there has not yet been a decided outcome on the filed reply.

Figure 1D:
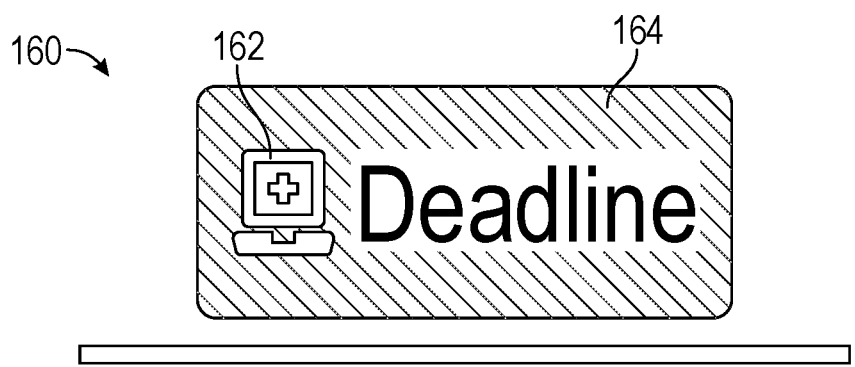

In yet another non-limiting example shown in FIG. 1D, the pleading tag 160 comprises an icon 162 and a background color 164 that corresponds with an "alpha type" of a "deadline," which refers to a general deadline imposed by the court. In this example, the pleading tag 160 therefore contains no different identifier and no colored border, since a deadline would not have either any independent substance or procedural posture, or an outcome.

In at least a further example of the disclosure, one or more pleading tags, including, for example, the pleading tags shown in FIGS. 1A-1D, may be displayed directly on a court's docket report, as shown in FIG. 2. The docket report 200 contains various pleading tags, including, for example, pleading tag 202 displayed within docket entry number 54, which is an order granting in part, and denying in part, a motion to compel. Such a display may include a GUI element that allows a user such as an attorney to visually identify litigation pleadings, as well as information about these pleadings, in the context of a docket sheet without using a separate interface or graphical display.

Figure 3:
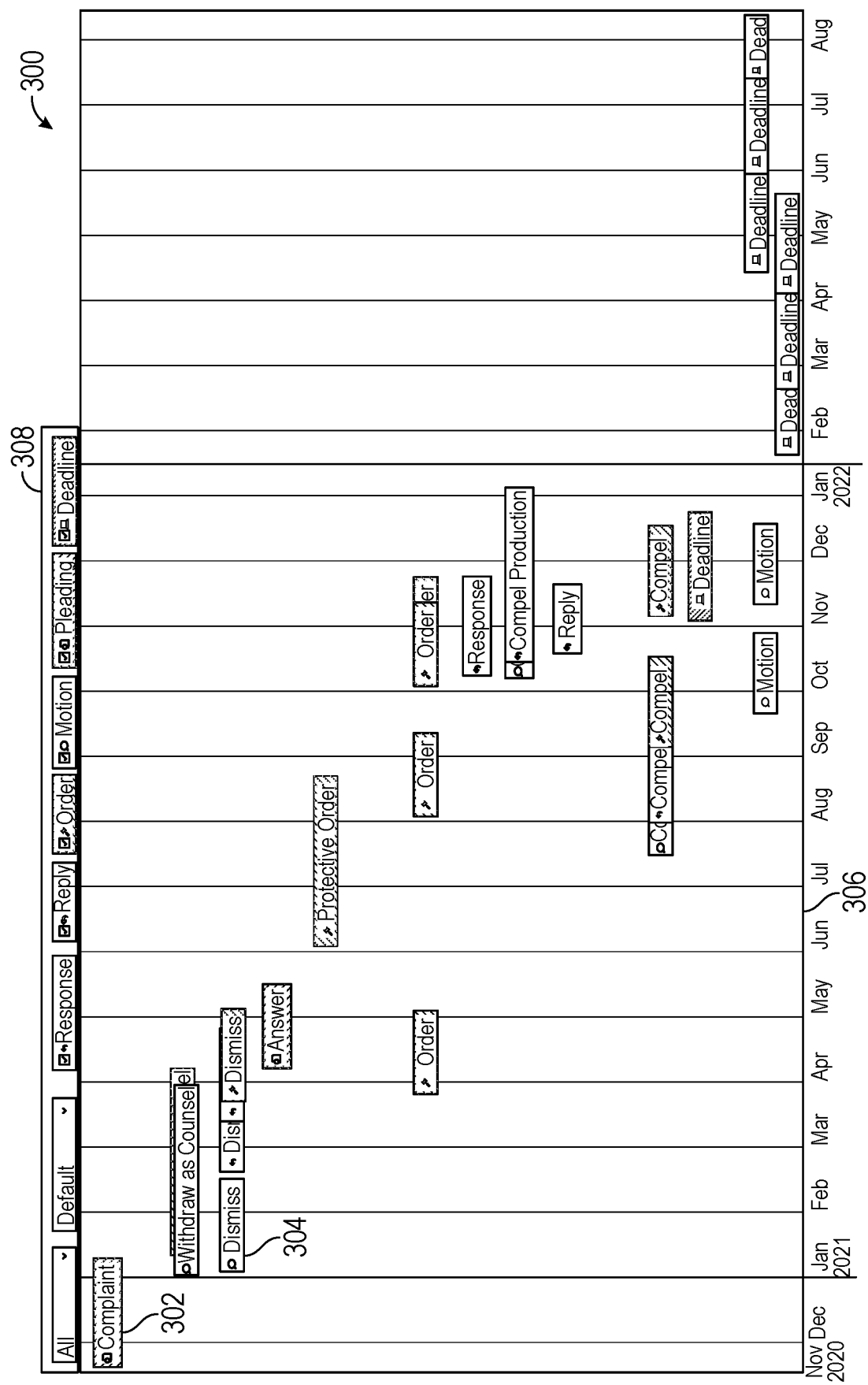
FIG. 3 shows a screenshot of pleading tags on an interactive timeline, according to one example of the present disclosure.

An additional type of pleading tag display or GUI element is shown in FIG. 3. A screenshot 300 shows various pleading tags (e.g., pleading tags 302 and 304) arranged chronologically on a timeline 306. The screenshot 300 further contains filtering options 308 that enable attorneys to sort and/or view only pleading tags that are useful or relevant to them. Pleading tags as shown in screenshot 300, may be shown on one or more graphical user interfaces (GUIs).

Pleading tags may also be integrated into a search results page, as shown in FIG. 4. Search results page 400 shows search results in response to a user search of a specific judge in search field 402. The results include, for example, litigation pleading tags 404 and 406 that identify filings in case 408 that is currently in front of that judge.

Figure 5:
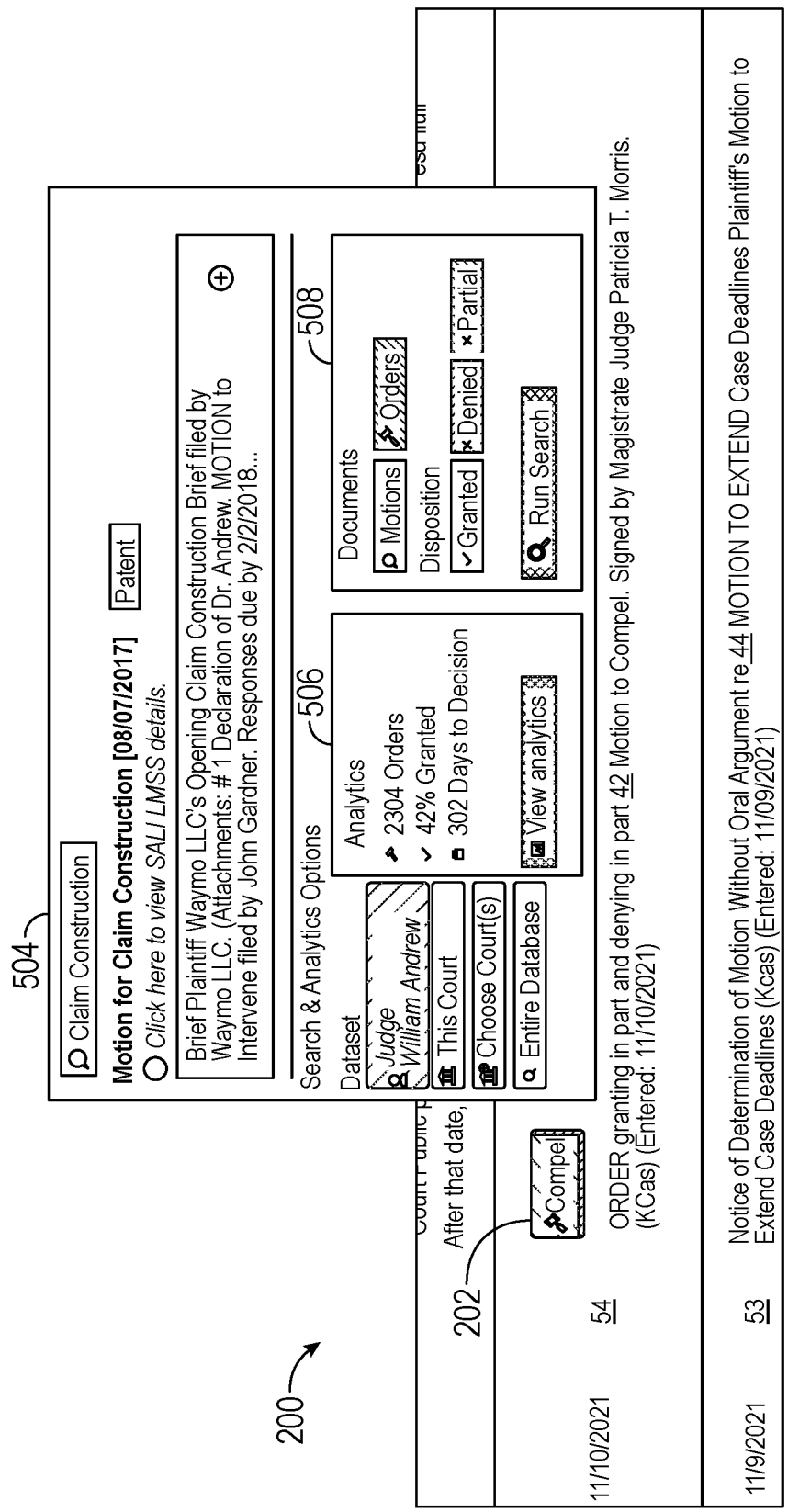
FIG. 5 shows a screenshot of user interaction with pleading tags and linking to additional content, according to one example of the present disclosure.

Users may also interact with or select one or more pleading tags, such as any of the pleading tags described above herein, to obtain further additional contextual and other information. FIG. 5 shows a docket report, which is the docket report 200 shown in FIG. 2. As in FIG. 2, the docket report 200 includes pleading tag 202 displayed within docket entry number 54, which is an order granting in part, and denying in part, a motion to compel. When a user interacts with the pleading tag 202 by, e.g., clicking the pleading tag 202 or selecting the pleading tag 202 or moving a cursor or other indicator over the pleading tag 202, a pop-up window or GUI element 504 can be displayed. The window or GUI element 504 provides additional contextual content such as information associated with a Motion for Claim Construction associated with a brief filed by a plaintiff that may be useful to the user, such as, for instance, analytics data 506 such as a number of orders from a judge from a particular court as well as a percentage of orders granted and a number of days to decision and further search options 508 associated with a judge or court including documents including motions and orders as well as disposition information including granted, denied, and partial. It should be appreciated that other contextual content may be displayed in window 504, including, for example, relevant statutes, regulations, deadlines, case law, and law review articles, among other secondary source material.

FIG. 6 shows a screenshot 600 of a pleading tag picker graphical user interface (GUI) according to an example of the instant disclosure. As shown in FIG. 6, the pleading tag picker 602 provides a number of features. The pleading tag picker 602 allows users to select or query for a pleading tag by the identifier, category, alpha, or a combination thereof. The pleading tag picker can accommodate multiple selection modes because users of the system may wish to select pleading tags in different ways. For example, some users may want to browse pleading tags by motion category, and then select a motion of interest. Other users may have a particular pleading tag in mind. The pleading tag picker 602 may allow the user to quickly locate the pleading tag. Still other users may desire to find "top motions" or top pleadings, ranked by either an importance level or the frequency of occurrence over a particular set of dockets. The pleading tag picker 602 accommodates all of these selection modes. To accommodate these selection modes, the pleading tag picker 602 allows nesting of the motions by identifier, alpha, and category, and a sort order option that allows the nesting and sorting to be customized by a sort order selector.

Accordingly, if a user wants to browse motions and pleadings generally, the user may select a category sort, and the lower nested levels may be the identifier, and alpha. In this example, a user can select a category to find all motions that fall in that category, or select a nested identifier to find only documents matching that identifier, or they may select on an alpha nested under an identifier, that only find documents with both the matching alpha and identifier. In another example, if a user wants to view "top motions", the user may sort the motions by count or importance, and the identifiers with the top importance levels or count will be displayed, with the alpha will be nested underneath. In this example, the category is not displayed at all. Another selection mode may allow the user to sort by "category/importance." In this example, pleadings are nested by category, identifier, and then alpha, however, the categories are sorted using a linear or weighted sum of the top identifiers, within the category. By sorting pleading tags by both importance and category, users can find the most important motions or pleadings in a user-friendly and browsable manner.

The pleading tag picker 602 includes count information 604 to the right of each line in the pleading tag picker 602. The count information 604 may indicate either a number of pleading tags that may be responsive to a query or set of filters, the number of unique pleading tags responsive to a query, or the number of cases that contain pleading tags responsive to the query, depending on user input. The user may export pleading tag information provided by the pleading tag picker 602 to other file formats such as EXCEL, CSV, or others. The user may also utilize an API to connect the counts in the pleading tag picker 602 with an external third-party service.

A user may enter text into a text field 606 to filter by motion or pleading name. As shown in FIG. 6, a user can view available Motions and Pleadings by expanding a category including Procedural, Pleading, Dispositive, Dismiss, Judgment, Orders, Motions, Responses, and Replies. In addition, a user can select Dismiss: Failure to State a Claim, Summary Judgment, Default Judgment, Dismiss: Lack of Jurisdiction, Judgment on the Pleadings, Voluntary Dismissal, Dismiss Claim, Dismiss Party, Dismiss Indictment, Dismiss: Lack of Personal Jurisdiction, Dismiss: Lack of Subject Matter Jurisdiction, Dismiss Charge, Judgment of Acquittal, Judgment as a Matter of Law, Declaratory Judgment, Dismiss: Lack of Standing, Dismiss: Failure to Prosecute, Summary Judgment: FRCP 56(d), Timing, Responding to Pleadings, Judgment, Counsel, Order, Discovery, Equity, and more. When a category is expanded, the individual pleading tags that fall under the category can be displayed.

Figure 7:
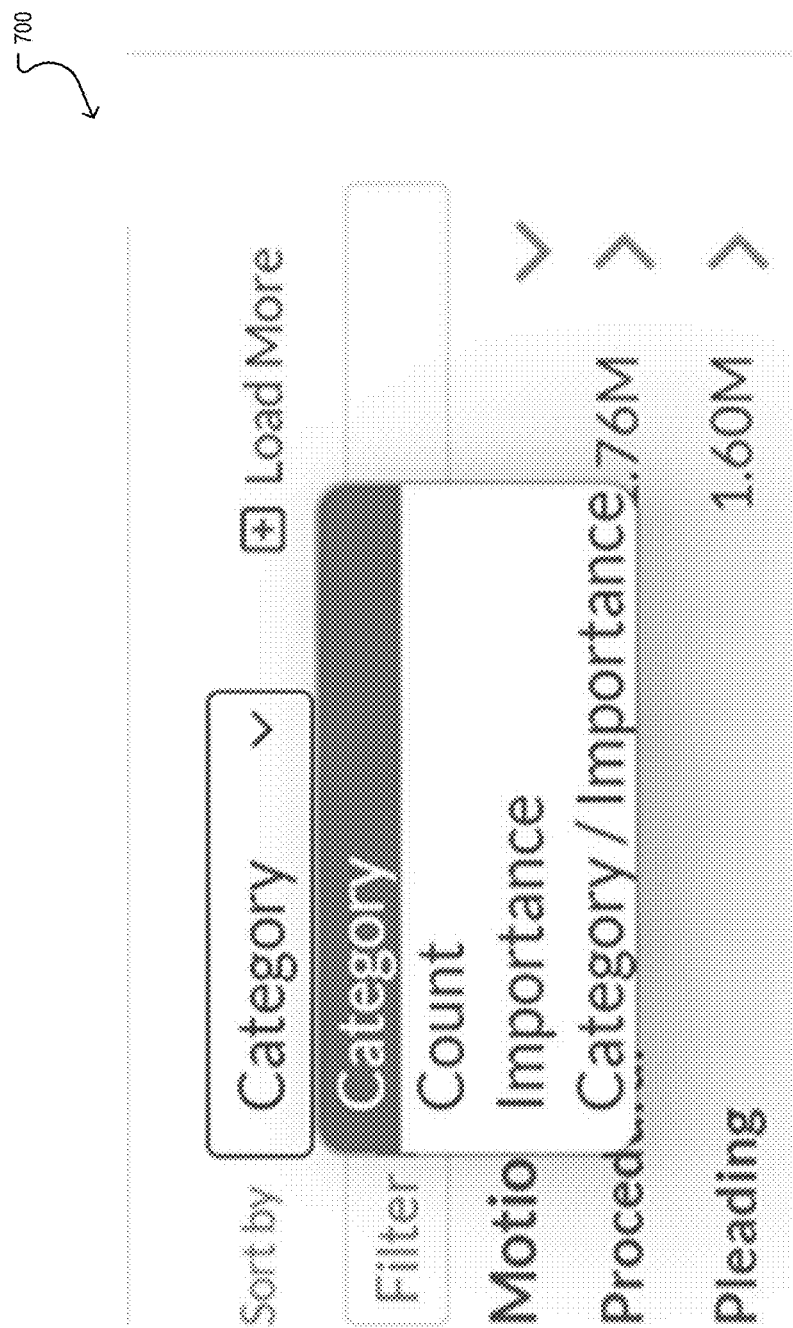
FIG. 7 shows a screenshot that demonstrates sorting of motions, according to one example of the present disclosure.

FIG. 7 shows a screenshot 700 that demonstrates sorting using the pleading tag picker 602 according to an example of the instant disclosure. As shown in FIG. 7, a user may sort by a number of different options including by Category, Count, Importance, and Category/Importance, among others. When a user selects one of the options, the pleading tag picker 602 may be re-sorted based on the selected option.

Figure 8:
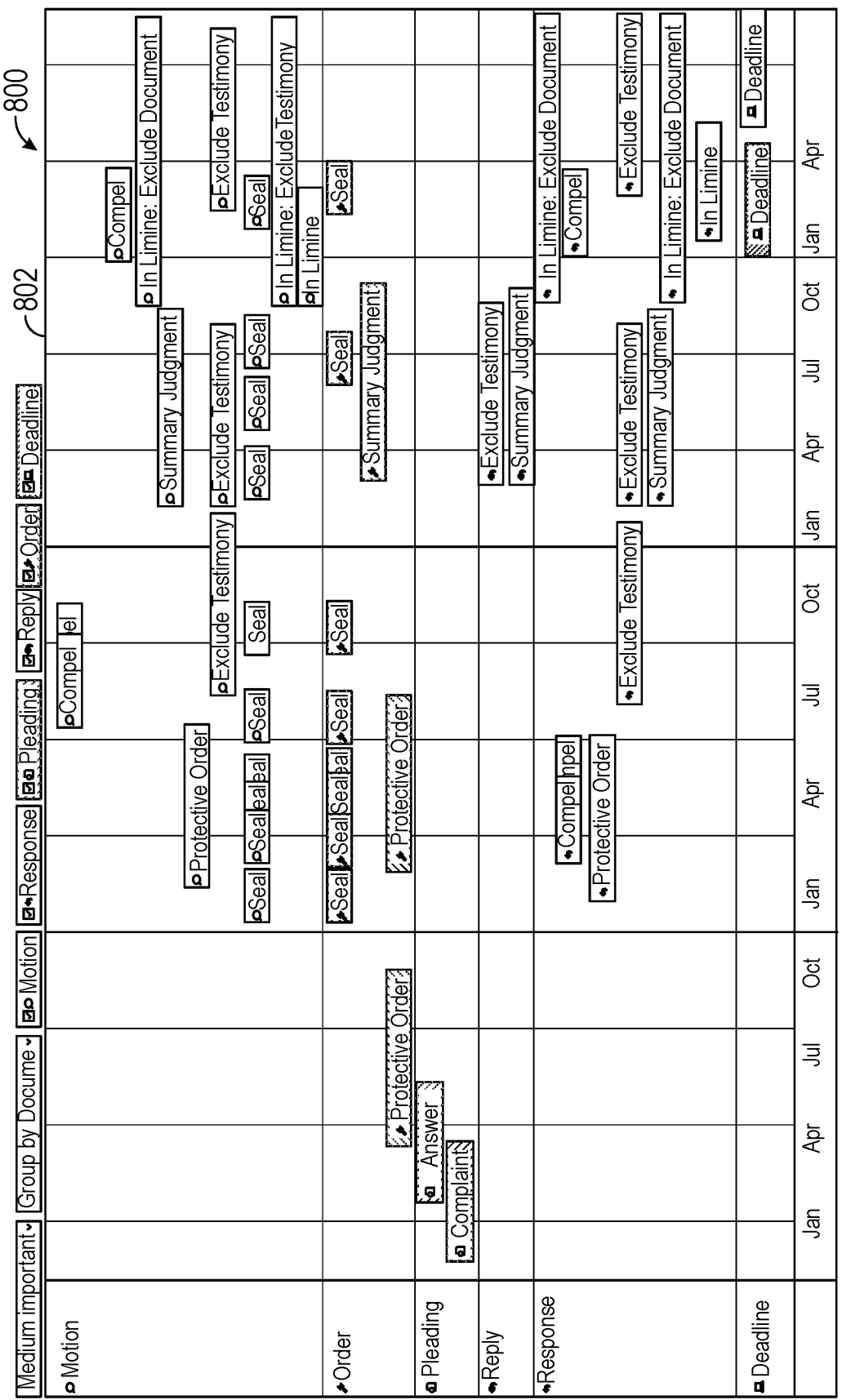
FIG. 8 shows a screenshot that shows a docket timeline grouped by alpha type according to one example of the present disclosure.

FIG. 8 shows a screenshot 800 that shows a docket timeline 802 grouped by alpha type according to an example of the instant disclosure. As noted above, "alpha type" of a "deadline," refers to a general deadline imposed by the court. Other "alpha types" may be "Reply" to a motion or "Pleading" among other options including "Motion," "Response," and "Order" as shown in FIG. 8.

Alpha types may be shown and the timeline is grouped vertically by alpha types. As shown in FIG. 8, the alpha type of "Motion" is shown at the top followed by "Order", followed by "Pleading", followed by "Reply", followed by "Response", followed by "Deadline". They are shown chronologically on the docket timeline 802. A user can select an option to filter by importance. Currently, "Medium Importance" is selected.

As further shown in FIG. 8, a user can zoom into and out of the timeline 802 using an input device. In addition, a user can move left or right chronologically using an input device. When moving left, this moves a case back in time chronologically and when moving right, this moves forward chronologically in the case. When a user moves an input device over one of the elements in the timeline associated with the case, it may display additional information.

As an example, a user may filter specific docket entries by "alpha type", e.g., only show orders/motions, or other docket entries. As another example, a user may filter identifiers by "importance level". This may generate a timeline that may show pleading tags 100 that have an importance level that is greater than a particular threshold such as eight, 4/5, 8/10, 80%, or 0.8. As another example, a user may group timeline pleading tags by "alpha" or "identifier."

Figure 9:
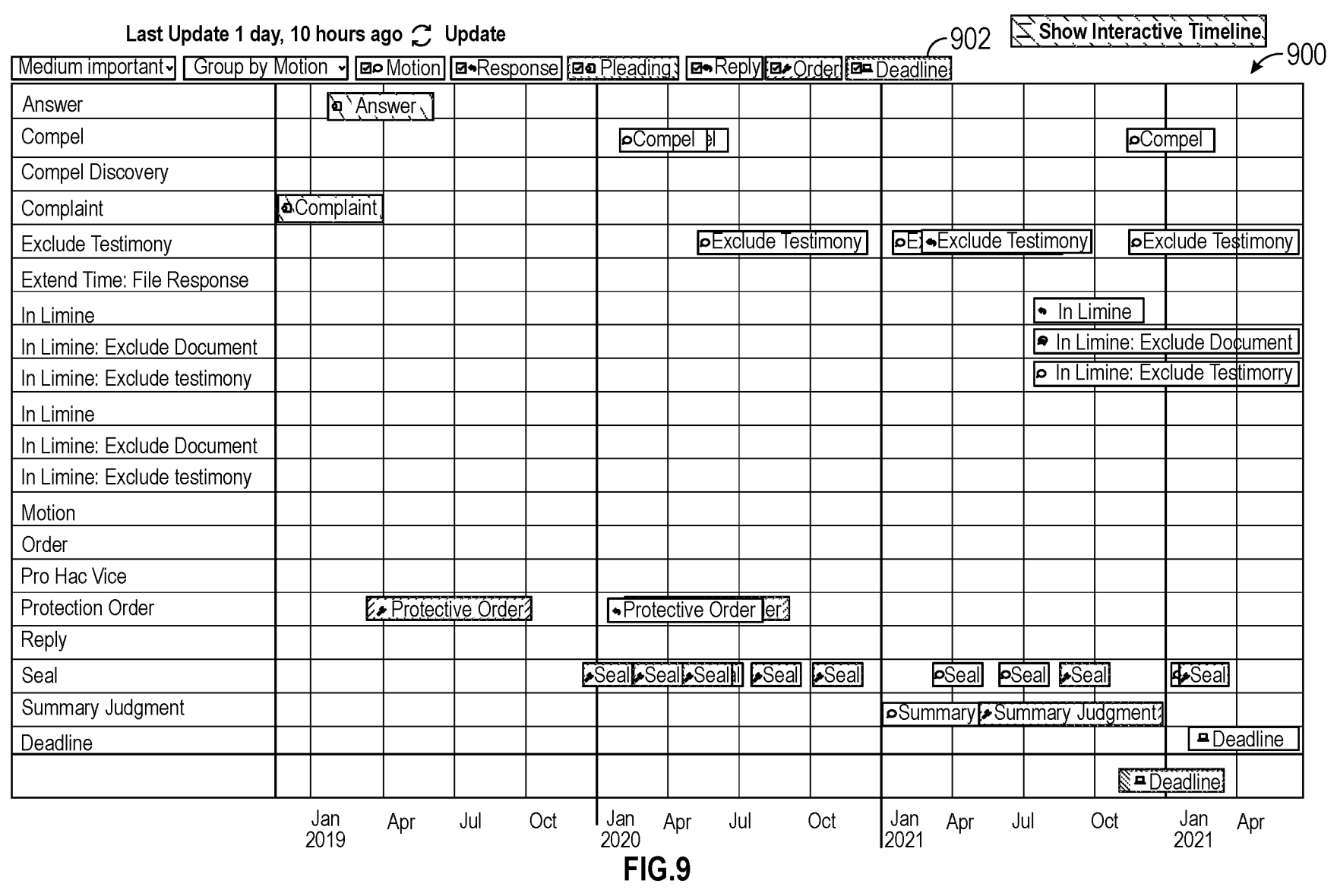

FIG. 9 shows a screenshot 900 that shows a docket timeline 902 grouped by identifier rather than grouped by alpha type in FIG. 8 according to an example of the instant disclosure. As noted above, a pleading tag 100 may have the descriptor 106 that corresponds to the "identifier," in a case, e.g., "Dismiss" for a filed motion to dismiss.

As shown in FIG. 9, identifiers may be shown and the timeline is grouped vertically by identifiers. "Answer" is shown at the top, followed by "Compel", followed by "Compel Discovery", followed by "Complaint", followed by "Exclude Testimony", followed by Extend Time File Response", followed by "In Limine", followed by "In Limine: Exclude Document", followed by "In Limine: Exclude Testimony", followed by "Motion", followed by "Order", followed by "Pro Hac Vice", followed by "Protective Order", followed by "Reply", followed by "Seal", followed by "Summary Judgment", followed by "Deadline". They are shown chronologically on the docket timeline 902. A user can select an option to filter by importance. Currently, "Medium Importance" is selected.

FIG. 10 shows a screenshot 1000 that shows snippet generation according to an example of the instant disclosure. As shown in FIG. 10, a snippet may include a miniature docket report 1002 that may be provided in search results and there may be pleading tags 202 embedded in the search results. The miniature docket report can be generated by finding the most relevant docket entries responsive to the query within a larger docket sheet. The most relevant docket entries may be determined based on the search query. For example, if searching for a Motion to Dismiss pleading tag, docket entries that are tagged with the same pleading tag can be ranked with higher relevancy. Docket entries that partially match the requested query (e.g., Order on a Motion to Dismiss rather than the actual motion) may also be identified, but with potentially lower relevancy. Snippet generation rules may be applied, such as to always show certain pleading tags regardless of the user's input (e.g., always showing the complaint). Query keyword matches may also influence which docket entries are displayed in the miniature docket report (e.g., docket entries with matching keywords will rank higher). Upcoming deadlines may also influence the docket entry relevancy ranking, as users often prefer to see events that give rise to upcoming deadlines. All else being equal, newer docket entries may be ranked higher than older docket entries. When more docket entries match than can reasonably be displayed to a user, the docket entry relevancy ranking system can use a ranking algorithm such as Term Frequency-Inverse Document Frequency (TF-IDF) or Best Match (BM25), or other algorithms, to rank and filter out docket entries to find the most relevant entries. It is appreciated that generating a list of docket entry snippets to create a miniature docket report from a single document, can be intrinsically similar to generating a list of search results from a single search query. Accordingly, the relevancy ranking systems that are used in the search engine may also be applied to snippet generation.

Figure 11:
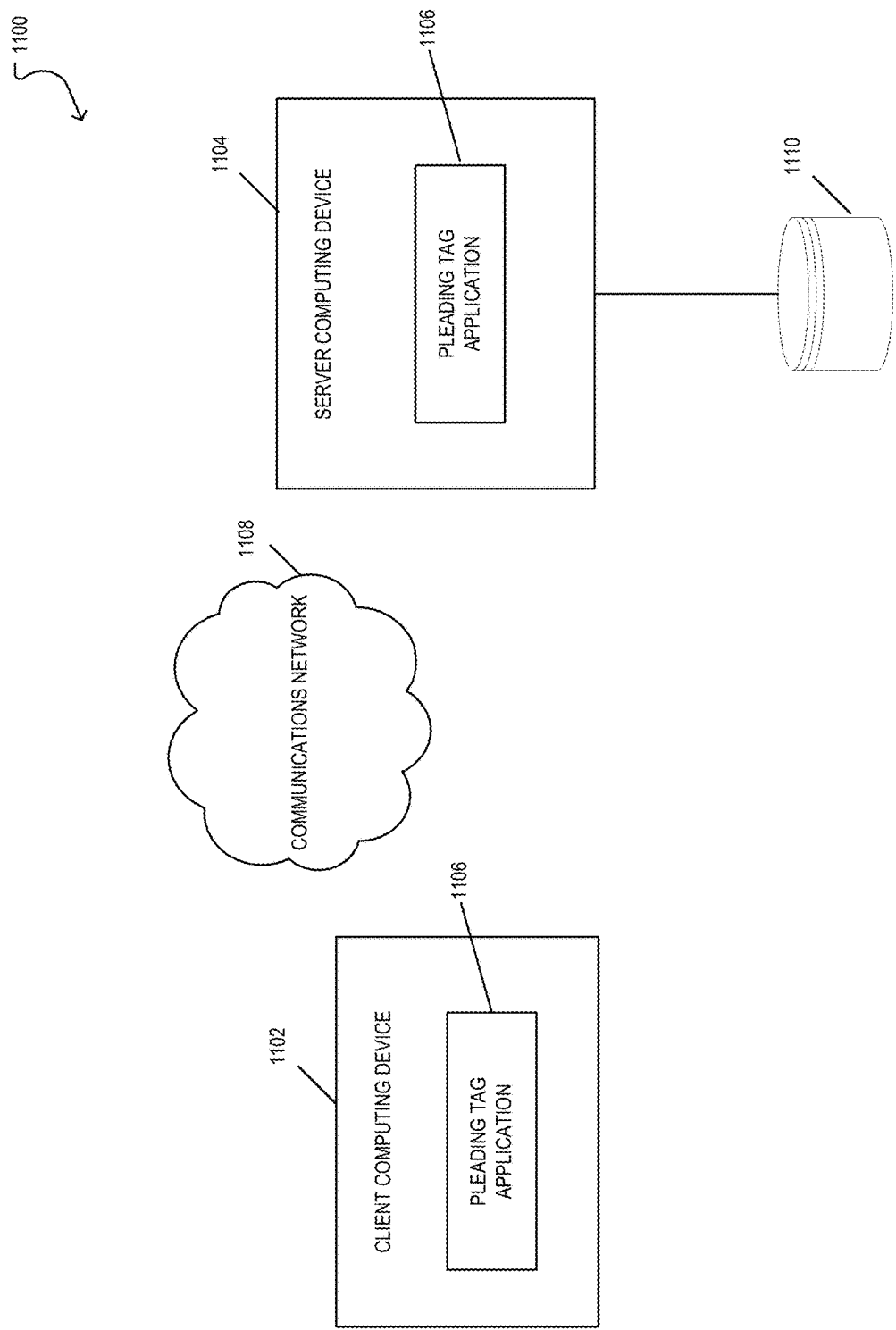
FIG. 11 is a block diagram of a pleading tag system, according to one example of the present disclosure.

FIG. 11 is a block diagram of a pleading tag system 1100 according to an example of the instant disclosure. As shown in FIG. 11, the system 1100 may include at least one client computing device 1102 as well as at least one server computing device 1104. The client computing device 1102 and the server computing device 1104 may have a pleading tag application 1106. As an example, there may be a server-side component of the pleading tag application 1106 as well as a client-side component of the simulation application 1106. The at least one server computing device 1104 may be in communication with at least one database 1110.

The client computing device 1102 and the server computing device 1104 may have the pleading tag application 1106 that may be a component of an application and/or service executable by the at least one client computing device 1102 and/or the server computing device 1104. For example, the pleading tag application 1106 may be a single unit of deployable executable code or a plurality of units of deployable executable code. According to one aspect, the pleading tag application 1106 may include one or more components that may be a web application, a native application, and/or a mobile application (e.g., an app) downloaded from a digital distribution application platform that allows users to browse and download applications developed with software development kits (SDKs) including the App Store and GOOGLE PLAY®, among others.

The pleading tag system 1100 also may include a relational database management system (RDBMS) or another type of database management system such as a NoSQL database system that stores and communicates data from at least one database 1110. As another example, the pleading tag system 1100 may include or communicate with a full-text search engine a traditional full-text search engine, e.g., Elasticsearch, Solr, or Lucene; or an analytics engine, e.g., Snowflake, Power BI). The search engine may retrieve case information having pleading tag information. The data stored in the at least one database 1110 may be associated with one or more users associated with the system, structured and unstructured text associated with court cases, docket sheets associated with court cases, timelines and timeline information associated with court cases, documents associated with the docket sheets, and items associated with the documents and docket sheets, among other information.

The at least one client computing device 1102 and the at least one server computing device 1104 may be configured to receive data from and/or transmit data through a communication network 1108. Although the client computing device 1102 and the server computing device 1104 are shown as a single computing device, it is contemplated each computing device may include multiple computing devices.

The communication network 1108 can be the Internet, an intranet, or another wired or wireless communication network. For example, the communication network may include a Mobile Communications (GSM) network, a code division multiple access (CDMA) network, 3rd Generation Partnership Project (GPP) network, an Internet Protocol (IP) network, a wireless application protocol (WAP) network, a WiFi network, a Bluetooth network, a near field communication (NFC) network, a satellite communications network, or an IEEE 802.11 standards network, as well as various communications thereof. Other conventional and/or later developed wired and wireless networks may also be used.

The client computing device 1102 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the client computing device 1102 further includes at least one communications interface to transmit and receive communications, messages, and/or signals.

The client computing device 1102 could be a programmable logic controller, a programmable controller, a laptop computer, a smartphone, a personal digital assistant, a tablet computer, a standard personal computer, or another processing device. The client computing device 1102 may include a display, such as a computer monitor, for displaying data and/or graphical user interfaces. The client computing device 1102 may also include a Global Positioning System (GPS) hardware device for determining a particular location, an input device, such as one or more cameras or imaging devices, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The server computing device 1104 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the server computing device 1104 further includes at least one communications interface to transmit and receive communications, messages, and/or signals.

Figure 12:
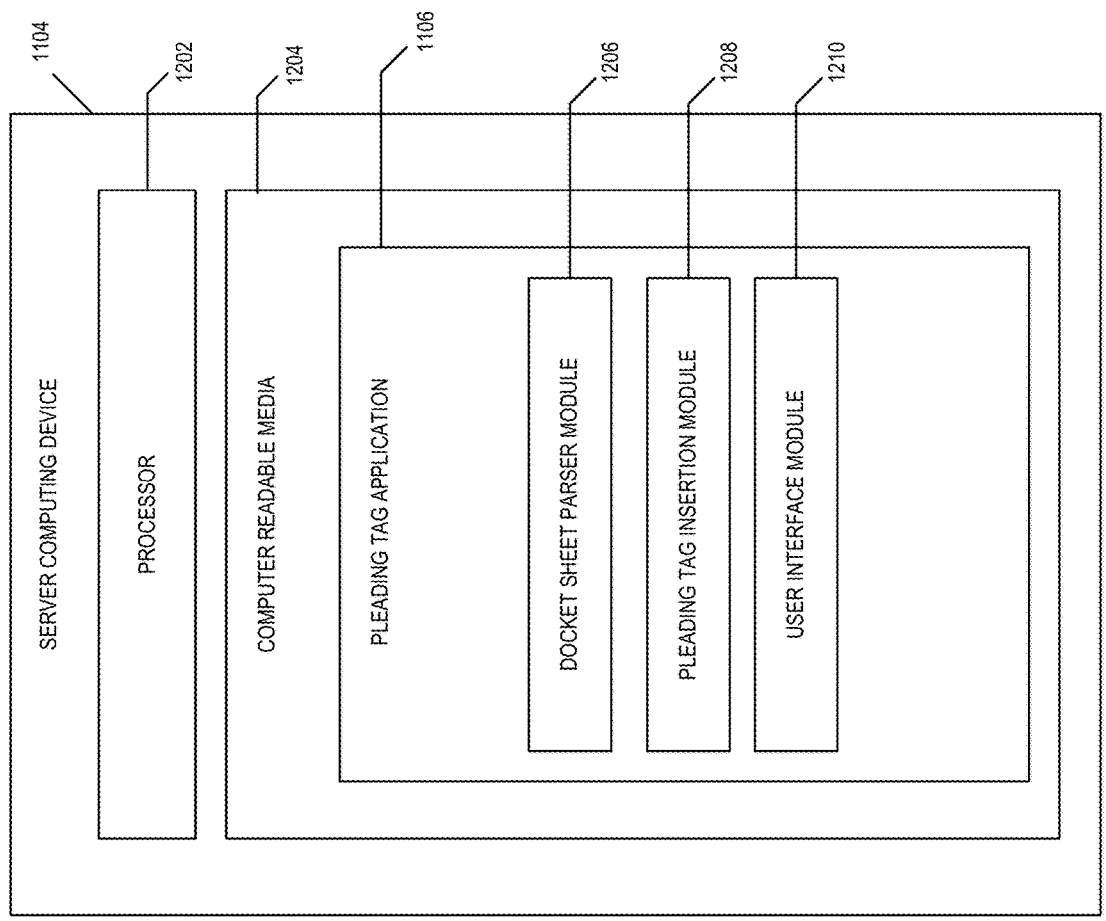
FIG. 12 is a block diagram of a pleading tag application of the pleading tag system, according to one example of the present disclosure.

FIG. 12 is a block diagram of the pleading tag application 1106 according to an example of the instant disclosure. The pleading tag application 1106 may be executed by the server computing device 1104. The server computing device 1104 includes computer readable media (CRM) 1204 in memory on which the pleading tag application 1106 is stored. The computer readable media 1204 may include volatile media, nonvolatile media, removable media, non-removable media, and/or another available medium that can be accessed by the processor 1202. By way of example and not limitation, the computer readable media 1204 comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The pleading tag application 1106 may include a docket sheet parser module 1206 according to an example of the instant disclosure. The docket sheet parser module 1206 may receive a docket sheet associated with a particular court case via a web application programming interface (API) or from another source and may parse text and/or other data associated with the docket sheet to determine whether to insert one or more pleading tags into the docket sheet. In one example, the docket sheet parser module 1206 may analyze docket entries in the docket sheet and using natural language processing (NLP) may determine a meaning of a particular docket entry automatically.

In one example, the docket sheet parser module 1206 may utilize Natural Language Toolkit, the Stanford NLP parser, or another NLP system such as the Judicata NLP system. As an example, first functions may be performed including breaking up text into constituent parts, breaking up individual words, identifying punctuation, paragraph markers, and performing other first functions. Each of these first functions may be considered a "building block." Next, second functions may be performed including transforming first "building blocks" based on parts of speech, ordering of words, synonyms, lists of legal terminology, and statute intrinsic knowledge about dockets. For third functions, a number of rules may be continuously applied to the "building blocks" transforming the "building blocks" into even more second "building blocks." As an example, there may be hundreds of rules. Each rule may address different variants. One rule may be used to identify headers and footers and identify parties and/or law firms. Thus, combinatorically, the docket parser module 1206 may handle billions of permutations of text. As fourth functions, individual building blocks may be converted to text. A document may be generated and marked up as a Legal Document Data Markup Language (LDML) document. LDML is based on extensible markup language (XML). The LDML document may include original text as well as tags associated with each "building block." As fifth functions, the LDML document may be processed in a final transformation where tags may be merged. In addition, certain tags may be assigned to identifiers and alpha types.

The pleading tag application 1106 may include a pleading tag insertion module 1208 according to an example of the instant disclosure. The pleading tag insertion module 1208 may insert information into the docket sheet associated with the particular court case at particular locations as determined by the docket sheet parser module 1206. In one example, the pleading tag insertion module 1208 may insert text, data, unique identifiers, and/or code at particular locations in the docket sheet to represent a pleading tag. In another example, the pleading tag insertion module 1208 can insert information associated with each pleading tag along an interactive timeline associated with a case. A user can interact with the interactive timeline to filter the pleading tags to view one or more types of pleading tags along the interactive timeline.

There are number of ways that the pleading tag insertion module 1208 may display the pleading tags. In one example, pleading tags may be embedded within a docket report itself. Each pleading tag may be shown in the docket sheet. As another example, a pleading tag may be shown in a timeline. As another example, a pleading tag may be shown within email alerts or another email related communication. As an example, when a docket is sent via email, pleading tags may be shown. The pleading tag may be shown in multiple parts of an email such as at a top of an email to highlight pleading tags that may have a high importance level, or directly next to the docket entry that gave rise to the pleading tag. As another example, pleading tags may be shown in search results. As another example, pleading tags may be shown in enhanced documents. A document may be "enhanced" with live docket data. This may include adding links to cases, dockets, complaints, or analytics within a document such as a WORD, EXCEL, CSV, or HTML document. As another example, pleading tags may be provided in data feeds. A data feed may be associated with another server computing device provided by a third party.

The pleading tag insertion module 1208 may also ensure that each pleading tag has associated independent attributes, e.g., alpha type, identifier, and outcome, among others. The independent attributes may be tuned for use in analyzing litigation or other types of adversarial dockets, e.g., a patent application. The list of tags associated with a docket sheet and interrelated parentage can be displayed independently of each other. With respect to parentage, there may be multiple identifiers that could be found when searching. However, when displayed, parentage is displayed based on a child and determined by the child. As an example, if a user searches for a parent (e.g., a motion to dismiss), children also may be retrieved (e.g., a motion to dismiss 12(*b*)(6)). However, if you search for a child, you may not receive parent information.

The pleading tag insertion module 1208 may provide or associate each pleading tag with parentage including literal parentage as well as conceptual category parentage, among other types of parentage. Regarding literal parentage, searches/analytics may flow to descendants (e.g., children/grandchildren). As an example, when searching for a parent, children are automatically searched. When searching for a child, parents are not automatically searched. When excluding a parent from a search, children also may be excluded from the search.

As an example, there may be sequence linking pleading tags. Pleading tags may be linked together in a procedural sequence, such as a motion sequence. A motion sequence may include a Motion to Dismiss, a Response to Motion to Dismiss, a Reply to Response to Motion to Dismiss, and Order on Motion to Dismiss. These pleading tags may be part of a same motion sequence. Thus, the pleading tag insertion module 1208 may group the pleading tags together to build a relationship between each of the pleading tags in the sequence. By linking documents in the motion sequence, a user can jump from opening arguments in the motion to disagreements in a response, and a resolution in the order. This also allows the pleading tag insertion module 1208 to provide timing analysis. Briefing time or time from the close of briefing to the order may be determined. Sequencing documents also aids with NLP and machine learning analysis. By comparing opening arguments to arguments in the response to decisions and outcomes in the order, machine learning models associated with the pleading tag insertion module 706 can be developed to identify winning arguments. In particular, a language model text generation tool (e.g., OpenAI's GPT-3, META's OPT-175B) can be trained with one or more of the text of opening arguments, arguments to the response, and the arguments in the final decision to build a legal AI language generation model. The legal AI language generation model can be used to generate motions, responses to motions, and court opinions, among other types of documents. The legal AI language generation model can further be tied to standard legal forms (e.g., motion templates, bankruptcy forms, notices) to support auto-completion and auto-suggestions for filling out and completing legal forms.

Additionally, there may be sequence linking versus parent/conceptual linking. Parent/conceptual linking may be based solely on identifiers. As an example, dismiss_charge may be a child of dismiss. However, with sequence linking, the linking may be further based on additional context in the docket. In addition to motion sequences, pleading tags may be linked on other criteria, including amendments to an original document (e.g., an amended complaint), or pleading tags linked by particular phases of trial (e.g., discovery, motion practice). Thus, static links may be based on identifiers and alpha types and there may be dynamic links based on a set of rules and context within the docket entry.

Literal parentage hierarchy example:
dismiss includes:
dismiss_charge
dismiss_indictment
dismiss_case includes
dismiss_case voluntary includes
dismiss_case voluntary stipulation
etc.

Conceptual category parentage (e.g., multiple parentage) examples are shown below. This includes classifying document types according to multiple categories/attributes.

Example One: Motion to Dismiss

Category/Child of Dispositive Motions
Category/Child of Motions Responding to Pleadings Example Two: Motion for Judgment as a Matter of Law Category/Child of Dispositive Motions
Category/Child of Trial Motions
Category/Child of Motions for Judgment For example, a user searching for dispositive motions or motions responding to pleadings may receive results associated with Motion to Dismiss.

The pleading tag application 1106 may include a user interface module 1210. The user interface module 1210 receives requests or other communications from the client computing device 1102 and transmits a representation of requested information, user interface elements, and other data and communications to the client computing device 1102 for display on the display. As an example, the user interface module 1210 generates a native and/or web-based graphical user interface (GUI) that accepts input and provides output by generating content that is transmitted via the communications network 1108 and viewed by a user of the client computing device 1102. The user interface module 1210 may provide realtime automatically and dynamically refreshed information to the user of the client computing device 1102 using Java, Javascript, AJAX (Asynchronous Javascript and XML), ASP.NET, Microsoft .NET, and/or node.js, among others. The user interface module 1210 may send data to other modules of the pleading tag application 1106 of the server computing device 1104, and retrieve data from other modules of the pleading tag application 1106 of the server computing device 1104 asynchronously without interfering with the display and behavior of the client computing device.

Figure 13:
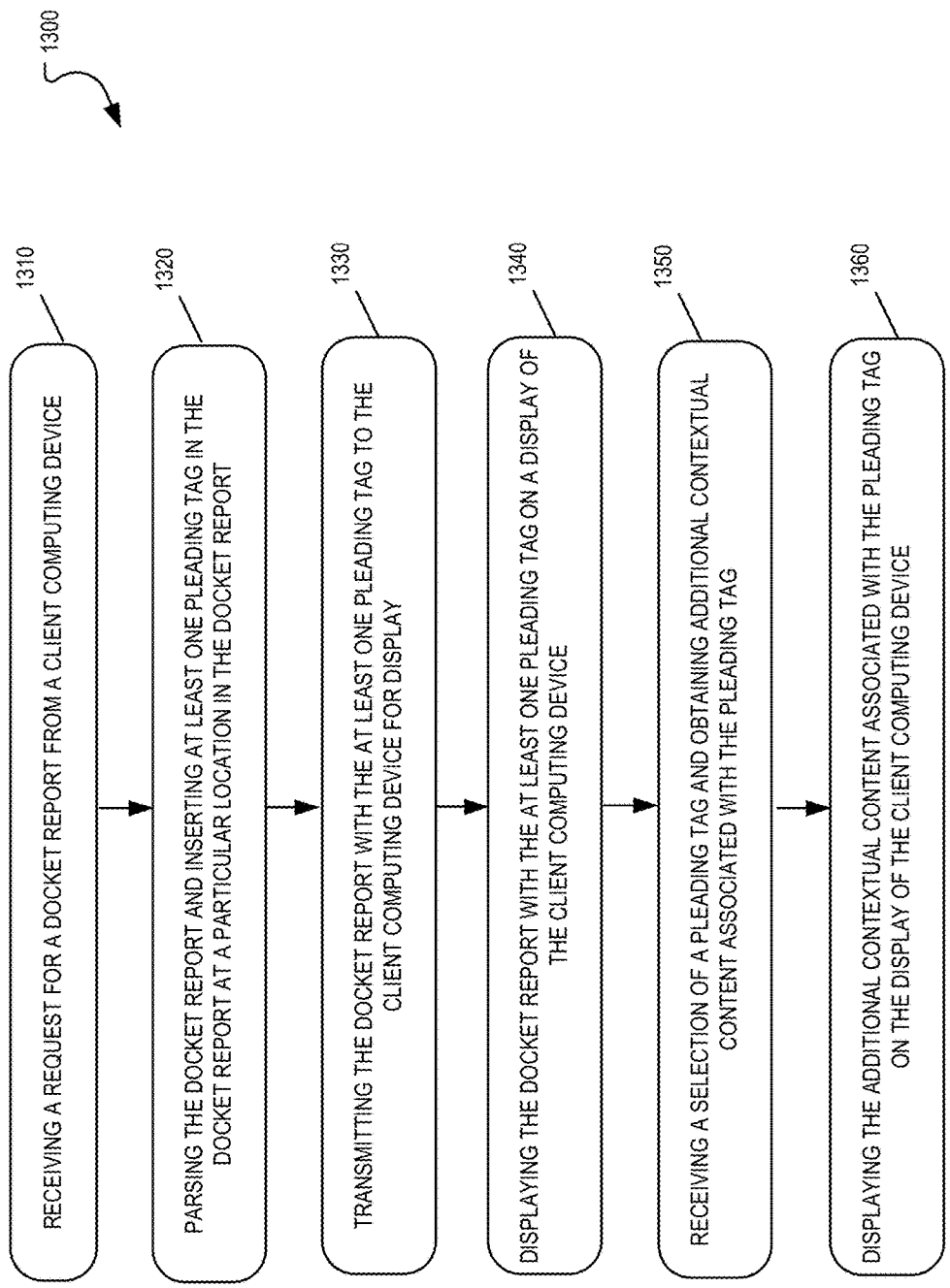
FIG. 13 is a flowchart of a method of inserting at least one pleading tag in a docket sheet, according to one example of the present disclosure.

FIG. 13 illustrates an example method 1300 of inserting one or more pleading tags in a docket sheet according to an example of the instant disclosure. Although the example method 1300 depicts a particular sequence of operations, the sequence may be altered without departing from the scope of the present disclosure. For example, some of the operations depicted may be performed in parallel or in a different sequence that does not materially affect the function of the method 1300. In other examples, different components of an example device or system that implements the method 1300 may perform functions at substantially the same time or in a specific sequence.

According to some examples, the method 1300 may include the pleading tag application 1106 of the server computing device 1104 receiving a request for a docket report 200 associated with a particular case from the client computing device 1102 at block 1310. The docket report 200 may include a list of at least one paper filed in the particular case and at least one action taken in the case. As another example, the docket report 200 may include a list of at least one motion filed in the particular case and at least one order taken in the case.

Next, according to some examples, the method 1300 may include parsing the docket report 200 and text associated with the docket report at block 1320. In one example, the parsing may include inserting at least one pleading tag 202 in the docket report 200 at a particular location in the docket report. In some examples, the method 1300 may include performing natural language processing (NLP) on text in the docket report 200 to determine where to insert each pleading tag 202 at the particular location in the docket report 200. As an example, the pleading tag 200 may include at least one of an alpha type that identifies a type of litigation pleading, an identifier, and an outcome that identifies a result of the litigation pleading.

According to some examples, the method 1300 may include dividing the text in the docket report 200 into constituent parts of words, punctuation, and paragraph markers, each comprising a building block, transforming each building block based on a part of speech, ordering of words, synonyms, and at least one legal terminology list, applying at least one rule to the building blocks to generate additional building blocks, converting the building blocks to a Legal Document Data Markup Language (LDML) document comprising the text in the docket report and the at least one pleading tag, and transforming the LDML document to merge the at least one pleading tag and assign the at least one tag to identifiers and alpha types.

According to some examples, the method 1300 may include dividing the text in the docket report 200 into at least one first building block, each first building block comprising one of a word, punctuation, and a paragraph marker, transforming the at least one first building block based on at least one of a part of speech, ordering of words, synonyms, and at least one legal terminology list, applying at least one rule to the at least one first building block to generate at least one second building block, and converting the at least one first building block and the at least one second building block to a markup document comprising the text in the docket report and the at least one pleading tag. The method 1300 may further include transforming the markup document to merge the at least one pleading tag and assign the at least one tag to identifiers and alpha types.

Next, according to some examples, the method 1300 may include transmitting or sending the docket report 200 with the at least one pleading tag 202 to the client computing device 1102 for display on the display of the client computing device 1102 at block 1330. According to other examples, the method 1300 may include transmitting or sending the docket report 200 with the at least one pleading tag 202 to at least one third-party computing system having at least one server computing device using an application programming interface (API). In other words, the method 1300 may include sending raw data using the API. The raw data may include docket data having embedded pleading tag information.

Next, according to some examples, the method 1300 may include displaying the docket report 200 with the at least one pleading tag 202 on the display of the client computing device 1102 at block 1340. In some examples, the method 1300 may include displaying the pleading tag 202 on the display of the client computing device 1102, the pleading tag having an icon 102 and a background color 104. Additionally, the pleading tag 202 may have a descriptor 106 corresponding to the identifier and an outline 108 having an outline color that corresponds to the outcome. This is shown, for example, in FIG. 1A. As another example, the pleading tag 202 may have least one of an alpha type that identifies a type of litigation pleading, an identifier, and an outcome having a particular color that identifies a result of the litigation pleading.

Next, according to some examples, the method 1300 may include receiving a selection of a pleading tag 202 by a user of the client computing device 1102 and obtaining additional contextual content 504 associated with the pleading tag at block 1350.

Next, according to some examples, the method 1300 may include displaying the additional contextual content 504 associated with the pleading tag on the display of the client computing device 1102 at block 1360.

According to some examples, the method 1300 may include displaying an interactive timeline 306 on the display of the client computing device 1102, the interactive timeline showing each pleading tag 202 in the particular case grouped vertically by one of an alpha type and an identifier.

According to some examples, the method 1300 may include displaying a filter option 308 that receives input from a user to select at least one type of pleading tag 202 and displaying the at least one type of pleading tag 202 on the interactive timeline.

According to some examples, the method 1300 may include associating the at least one pleading tag 202 with one of literal parentage and conceptual category parentage.

According to some examples, the method 1300 may include displaying the pleading tag on the display of the client computing device 1102 when an importance level for the pleading tag is greater than a particular threshold value. According to some examples, the method 1300 may include displaying a pleading tag picker on the display of the client computing device 1102, the pleading tag picker comprising a plurality of user interface elements that displays a list of types of motions, each type of motion having a selectable user interface element.

According to some examples, the method 1300 may include sorting the list of types of pleadings using a sorting option based on at least one of category, count, and importance. As another example, the method 1300 may include nesting the list of types of pleadings using a nesting option based on at least one of identifier, alpha, and category. As another example, the method 1300 may include displaying the list of types of pleadings based on a number of each type of pleading.

According to some examples, the method 1300 may include generating a case summary for the particular case comprising a list of at least one pleading tag having an importance value that is greater than a particular threshold and a snippet of text for each pleading tag in the list.

According to some examples, the method 1300 may include generating a miniature docket report for the particular case comprising a list of at least one pleading tag having an importance value that is greater than a particular threshold and a snippet of text for each pleading tag in the list.

According to some examples, the method 1300 may include generating an enhanced document having docket data comprising the at least one pleading tag in the docket report, each pleading tag inserted at the particular location in the docket report, at least one link to another case different from the particular case, and analytics information.

According to some examples, the method 1300 may include transmitting the docket report 200 with the at least one pleading tag 202 to a server computing device such as a third party server computing device via a web application programming interface (API).

According to some examples, the method 1300 may include training a language model generation tool using at least one of opening arguments, arguments to a response, and arguments in a final decision to build an artificial intelligence (AI) language generation model, the AI language generation model generating at least one of motions, responses to motions, and court opinions.

One example of the purpose of connecting an API is to enhance law firm management information with pleading tag data. For example, in response to a user request, the third-party computing device may be a server that contains law firm matter, client, deadline, email/messaging, employee, or billing data, e.g., a law firm management system. The API may invoke the pleading tag data to be imported into the law firm management system, so that internal and confidential systems may be enhanced with data from the pleading tag 202. The API may also be invoked to import, synchronize, or update data into a law firm practice management system. The API may also be used to import data into a financial research tool that combines litigation and pleading tag data with public and private company information. The API may also be used to import data into other search engines, to supplement search engine results with additional pleading tag information from litigation. The API may also facilitate an intermediary API, that acts as a middle-man between the pleading tag data and the law firm management system. Intermediary APIs may include those that facilitate data conversion, security, logging, quota management, user management, and other middleware services, among others.

According to some examples, the method 1300 may include incorporating the docket report with the at least one pleading tag and law firm management information. As an example, the server computing device may be a law firm management server computing device, the method further comprising at least one of importing, synchronizing, and updating the law firm management information with the docket report with the at least one pleading tag.

As another example, a user may enter a search query into the search field 402 and select a user interface element that may initiate the search. The search query may be communicated to the at least one server computing device 1104. The search query may be formatted and analyzed by the at least one server computing device 1104 such that the search query may be modified to obtain more useful results. The query may be sent from the at least one server computing device 1104 to the Elasticsearch system that can provide unique identifiers. The unique identifiers may be used to find a case in one or more databases. Information may be merged into the search results. The search results may be transmitted by the at least one server computing device 1104 to the user to be displayed by the client computing device 1102. In addition, a snippet may be added to the search results for display by the user. As an example, additional requests for snippet data may be automatically initiated. A snippet generation system may generate a miniature docket report that may be embedded directly in the search results having the pleading tags within the search results.

Figure 14:
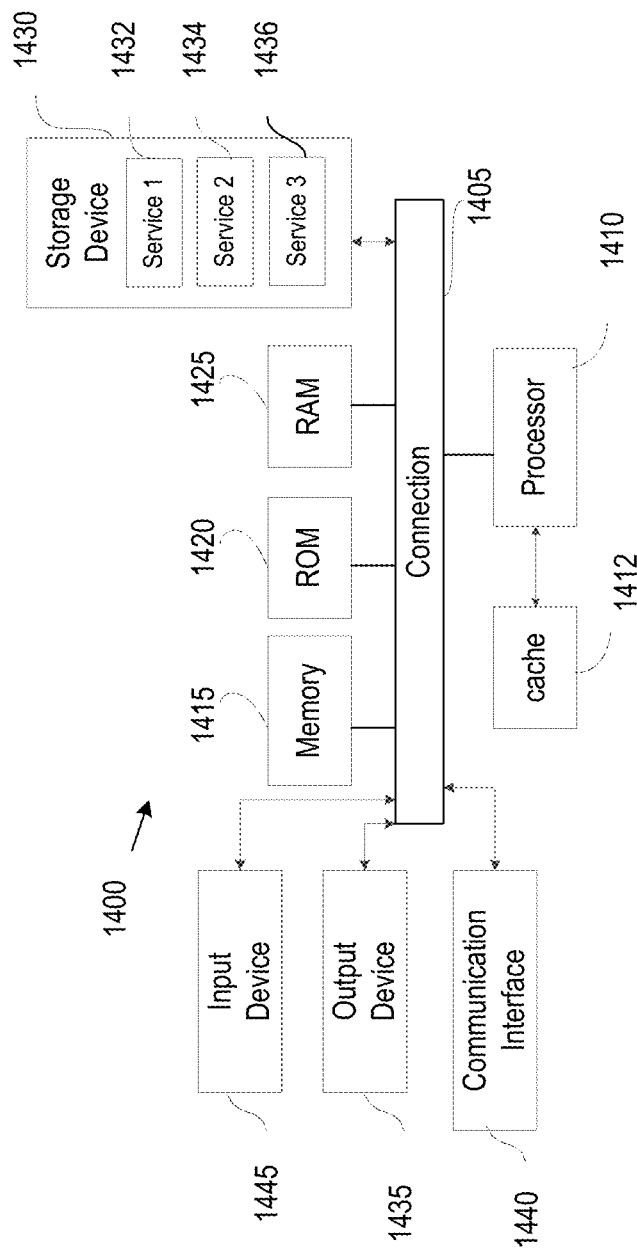
FIG. 14 is an example of a system for implementing certain aspects of the present technology, according to one example of the present disclosure.

FIG. 14 shows an example of computing system 1400, which can be for example any computing device making up the computing device such as the client computing device 1102, the server computing device 1104, or any component thereof in which the components of the system are in communication with each other using connection 1405. Connection 1405 can be a physical connection via a bus, or a direct connection into processor 1410, such as in a chipset architecture. Connection 1405 can also be a virtual connection, networked connection, or logical connection.

In some embodiments, computing system 1400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1400 includes at least one processing unit (CPU or processor) 1410 and connection 1405 that couples various system components including system memory 1415, such as read-only memory (ROM) 1420 and random access memory (RAM) 1425 to processor 1410. Computing system 1400 can include a cache of high-speed memory 1412 connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms known to those of skill in the art. In some instances, multimodal systems can enable a user to provide multiple types of input/output to communicate with computing system 1400. Computing system 1400 can include communications interface 1440, which can generally govern and manage the user input and system output. There is no restriction on operating on any particular hardware arrangement, and therefore the basic features here may easily be substituted for improved hardware or firmware arrangements as they are developed.

Storage device 1430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1430 can include software services, servers, services, etc., that when the code that defines such software is executed by the processor 1410, it causes the system to perform a function. In some embodiments, a hardware service that performs a particular function can include the software component stored in a computer-readable medium in connection with the necessary hardware components, such as processor 1410, connection 1405, output device 1435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

We claim:

1. A method, comprising:
receiving, by at least one processor, a request for a docket report associated with a particular case from a client computing device;
parsing, by the at least one processor, the docket report and inserting at least one pleading tag in the docket report, each pleading tag inserted at a particular location in the docket report;
performing natural language processing (NLP) on text in the docket report to determine where to insert each pleading tag at the particular location in the docket report;
dividing, by the at least one processor, the text in the docket report into constituent parts of words, punctuation, and paragraph markers, each comprising a building block;
transforming, by the at least one processor, each building block based on a part of speech, ordering of words, synonyms, and at least one legal terminology list;
applying, by the at least one processor, at least one rule to the building blocks to generate at least one second building block;
converting, by the at least one processor, the at least one first building block and the at least one second building block to a markup document comprising the text in the docket report and the at least one pleading tag;
training, by the at least one processor, a language model generation tool using at least one of opening arguments, arguments to a response, and arguments in a final decision to build an artificial intelligence (AI) language generation model, the AI language generation model generating at least one of motions, responses to motions, and court opinions based on the at least one pleading tag grouped into a motion sequence;
transmitting, by the at least one processor, the docket report with the at least one pleading tag to the client computing device for display on a display of the client computing device;
receiving, by the at least one processor, a selection of the at least one pleading tag and retrieving additional contextual content associated with the pleading tag; and
transmitting, by the at least one processor, the additional contextual content associated with the pleading tag to the client computing device for display on the display of the client computing device.

2. The method of claim 1, further comprising:
transforming the markup document to merge the at least one pleading tag and assigning the at least one tag to identifiers and alpha types.

3. The method of claim 1, further comprising:
applying the at least one rule to the building blocks to generate additional building blocks;
converting the building blocks to a Legal Document Data Markup Language (LDML) document comprising the text in the docket report and the at least one pleading tag; and
transforming the LDML document to merge the at least one pleading tag and assigning the at least one tag to identifiers and alpha types.

4. The method of claim 1, wherein the docket report comprises a list of at least one paper filed in the particular case and at least one action taken in the case.

5. The method of claim 1, wherein the docket report comprises a list of at least one motion filed in the particular case and at least one order taken in the case.

6. The method of claim 1, wherein the pleading tag comprises at least one of an alpha type that identifies a type of litigation pleading, an identifier, and an outcome that identifies a result of the litigation pleading.

7. The method of claim 6, further comprising displaying the pleading tag on the display of the client computing device, the pleading tag comprising an icon and a background color.

8. The method of claim 7, wherein the pleading tag further comprises a descriptor corresponding to the identifier and an outline having an outline color that corresponds to the outcome.

9. The method of claim 1, wherein the pleading tag comprises at least one of an alpha type that identifies a type of litigation pleading, an identifier, and an outcome having a particular color that identifies a result of the litigation pleading.

10. The method of claim 1, further comprising displaying an interactive timeline on the display of the client computing device, the interactive timeline showing each pleading tag in the case grouped vertically by at least one of an alpha type and an identifier.

11. The method of claim 10, further comprising displaying a filter option that receives input from a user to select at least one type of pleading tag and displaying the at least one type of pleading tag on the interactive timeline.

12. The method of claim 1, further comprising associating the at least one pleading tag with one of literal parentage and conceptual category parentage.

13. The method of claim 1, further comprising displaying the pleading tag on the display of the client computing device when an importance level for the pleading tag is greater than a particular threshold value.

14. The method of claim 1, further comprising displaying a pleading tag picker on the display of the client computing device, the pleading tag picker comprising a plurality of user interface elements that displays a list of types of pleadings, each type of pleading having a selectable user interface element.

15. The method of claim 14, further comprising sorting the list of types of pleadings using a sorting option based on at least one of category, count, and importance.

16. The method of claim 14, further comprising nesting the list of types of pleadings using a nesting option based on at least one of identifier, alpha, and category.

17. The method of claim 14, further comprising displaying the list of types of pleadings based on a number of each type of pleading.

18. The method of claim 1, further comprising generating a case summary for the particular case comprising a list of at least one pleading tag having an importance value that is greater than a particular threshold and a snippet of text for each pleading tag in the list.

19. The method of claim 1, further comprising generating a miniature docket report for the particular case comprising a list of at least one pleading tag having an importance value that is greater than a particular threshold and a snippet of text for each pleading tag in the list.

20. The method of claim 1, further comprising generating an enhanced document having docket data comprising the at least one pleading tag in the docket report, each pleading tag inserted at the particular location in the docket report, at least one link to another case different from the particular case, and analytics information.

21. The method of claim 1, further comprising transmitting the docket report with the at least one pleading tag to a server computing device via a web application programming interface (API).

22. The method of claim 21, further comprising incorporating the docket report with the at least one pleading tag and law firm management information.

23. The method of claim 22, wherein the server computing device comprises a law firm management server computing device, the method further comprising at least one of importing, synchronizing, and updating the law firm management information with the docket report with the at least one pleading tag.

24. A system comprising:
a memory storing computer-readable instructions; and
at least one processor to execute the instructions to:
receive a request for a docket report associated with a particular case from a client computing device;
parse the docket report and insert at least one pleading tag in the docket report, each pleading tag inserted at a particular location in the docket report;
perform natural language processing (NLP) on text in the docket report to determine where to insert each pleading tag at the particular location in the docket report;
divide the text in the docket report into constituent parts of words, punctuation, and paragraph markers, each comprising a building block;
transform each building block based on a part of speech, ordering of words, synonyms, and at least one legal terminology list;
apply at least one rule to the building blocks to generate at least one second building block;
convert the at least one first building block and the at least one second building block to a markup document comprising the text in the docket report and the at least one pleading tag;
train a language model generation tool using at least one of opening arguments, arguments to a response, and arguments in a final decision to build an artificial intelligence (AI) language generation model, the AI language generation model generating at least one of motions, responses to motions, and court opinions based on the at least one pleading tag grouped into a motion sequence;
transmit the docket report with the at least one pleading tag to the client computing device for display on a display of the client computing device;
receive a selection of the at least one pleading tag and retrieve additional contextual content associated with the pleading tag; and
transmit the additional contextual content associated with the pleading tag to the client computing device for display on the display of the client computing device.

25. The system of claim 24, the at least one processor further to:
transform the markup document to merge the at least one pleading tag and assign the at least one tag to identifiers and alpha types.

26. A non-transitory computer-readable storage medium comprising instructions stored thereon that, when executed by a computing device cause the computing device to perform operations, the operations comprising:
receiving a request for a docket report associated with a particular case from a client computing device;
parsing the docket report and inserting at least one pleading tag in the docket report, each pleading tag inserted at a particular location in the docket report;

performing natural language processing (NLP) on text in the docket report to determine where to insert each pleading tag at the particular location in the docket report;

dividing the text in the docket report into constituent parts of words, punctuation, and paragraph markers, each comprising a building block;

transforming each building block based on a part of speech, ordering of words, synonyms, and at least one legal terminology list;

applying at least one rule to the building blocks to generate at least one second building block;

converting the at least one first building block and the at least one second building block to a markup document comprising the text in the docket report and the at least one pleading tag;

training a language model generation tool using at least one of opening arguments, arguments to a response, and arguments in a final decision to build an artificial intelligence (AI) language generation model, the AI language generation model generating at least one of motions, responses to motions, and court opinions based on the at least one pleading tag grouped into a motion sequence;

transmitting the docket report with the at least one pleading tag to the client computing device for display on a display of the client computing device;

receiving a selection of the at least one pleading tag and retrieving additional contextual content associated with the pleading tag; and transmitting the additional contextual content associated with the pleading tag to the client computing device for display on the display of the client computing device.

27. The non-transitory computer-readable storage medium of claim 26, the operations further comprising:

transforming the markup document to merge the at least one pleading tag and assigning the at least one tag to identifiers and alpha types.

* * * * *